United States Patent Office 3,556,994
Patented Jan. 19, 1971

3,556,994
METAL WORKING AGENTS
Helmut Diery and Siegbert Rittner, Kelkheim, Taunus, and Horst Lorke, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 11, 1968, Ser. No. 743,953
Claims priority, application Germany, July 15, 1967, F 52,971; June 7, 1968, 1,771,548
Int. Cl. C10m 1/34, 1/38
U.S. Cl. 252—33.6
5 Claims

ABSTRACT OF THE DISCLOSURE

Agents in aqueous metal-working liquids having corrosion inhibiting action and being water soluble or water dispersible salts of inorganic or organic bases and an acid having the general formula

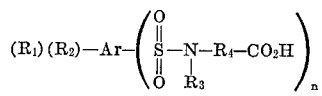

It is known that long-chain aliphatic sulphonamidocarboxylic acids possess affinity for metals and are used in aqueous solution or mineral-oil-containing emulsion in the metal-working industry both as aids for the machining of metals, in boring, thread-cutting, turning, milling, sawing and grinding of articles being worked, and also for non-cutting shaping on drawing and rolling, and furthermore in high frequency hardening, if water or aqueous solutions are employed for chilling.

The range of application of this class of compounds is however limited. In accordance with their constitution, these substances are capillary-active and oleophilic in their properties; they are therefore more or less well suited for use as emulsifiers, by themselves or in combination with other emulsifiers, for the emulsification of vegetable or animal oils, mineral oils, fat oils, fatty acids, lubricating greases and the like. Emulsions of this nature however show a series of disadvantages and unfavorable properties both in practical manipulation and also in properties. Thus water of low hardness should as far as possible be used for the manufacture of such emulsions. Special precautionary measures have to be observed in employing the emulsions. It is known that emulsions change their composition under factory conditions. They either lose water or oil which again makes a constant after-control of the oil or water additions inevitable. Emulsions frequently cream, break under the influence of high temperatures or are attacked by bacteria. It is a further disadvantage that emulsions are opaque so that the article being worked cannot be observed during the working process. Finally, spent emulsions must, after use, be broken in a plan for sewage reasons.

Attempts have for this reason been made to develop oil-free water-soluble cooling lubricants having corrosion protection action for iron and iron-containing alloys, which are effective even at high dilution and which do not exhibit the emulsion disadvantages described above. As such water-soluble products, those based on long-chain alkylsulphonamidocarboxylic acids or long-chain alkyl-arylsulphonamidocarboxylic acids have been proposed. However these products were also not able to afford full satisfaction. Thus for example the corrosion protection action is inadequate for many purposes. Other disadvantageous properties such as excessive foaming or adhesion on the machines frequently also interfere. Other oil-free metal working liquids which are utilised do not have as great a tendency to foam. On the other hand they have a lesser corrosion protection action.

It has now surprisingly been found that aromatic sulphonamidocarboxylic acids of general Formula I

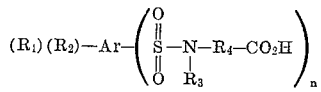

in the form of their salts with inorganic or organic bases in aqueous liquids are particularly advantageously suitable for use as metal-working agents having a highly effective corrosion protection for iron and iron-containing alloys and good lubricating action coupled with low tendency to foaming.

In Formula I $R_1$ and $R_2$ denote hydrogen, fluorine, chlorine, bromine or an alkyl or alkoxy residue having 1 to 4 carbon atoms, with the sum of the carbon atoms of the two residues $R_1$ and $R_2$ not exceeding the number 7, preferably the number 3, Ar denotes a benzene, naphthalene, anthracene, diphenyl, diphenylmethane, diphenyloxide, diphenylsulphide, diphenylsulphoxide or diphenylsulphone residue, $R_3$ denotes hydrogen, an alkyl residue having not more than 4 carbon atoms, the $\beta$-cyanoethyl residue or a hydroxyalkyl residue having 2 to 4 carbon atoms, $R_4$ denotes an alkylene residue having at least 4 carbon atoms in the chain which may furthermore optionally be substituted by one or more methyl or ethyl groups, and $n=1$ and, in the case where Ar is a benzene, naphthalene or anthracene residue, 1 or 2.

Possible bases for the formation of the salts with the above-mentioned sulphonamidocarboxylic acids are any desired inorganic or organic bases to the extent that they lead to water-soluble products. Herein "water-soluble" is also to be understood to include the colloidal, emulsoid or suspensoid state. For the salt formation it is for example possible to use, inter alia, alkalis or preferably organic bases such as for example monomethylamine, dimethylamine and trimethylamine, monoethylamine, diethylamine and triethylamine, monoisopropylamine, monobutylamine and dibutylamine, 3-methoxypropylamine, mono-2-ethylhexylamine, dimethylaminopropylamine, monoethanolamine, diethanolamine and triethanolamine, 3-aminopropanol, monomethylethanolamine, dimethylethanolamine, monoisopropanolamine, triisopropanolamine, cyclohexylamine, N,N-dimethylcyclo hexylamine, morpholine, pyridine, quinoline, ethylene diamine, diethylene triamine, pentaethylene hexamine or also amines, for example fatty amines, which have been reacted with alkylene oxides having 2 to 4 carbon atoms.

For the salt formation, the components may be employed in a stoichiometric ratio or also with either component in excess.

In order to manufacture aqueous metal-working liquids for the above-mentioned end uses according to the present invention, which may preferably be clear aqueous solutions but occasionally also emulsions or dispersions, the smallest possible quantities of the aids will be employed for economic reasons. In general a concentration of the aids of less than about 10% by weight suffices. It is a significant advantage of the corrosion protection and metal-working agent according to the invention that they already possess very good effectiveness at low concentration. Thus an adequate effect can, with the products according to the invention, in many cases already be achieved at a low concentration of about 0.1% by weight. The use concentration of the new corrosion protection and metalworking agents depends, as in the case of the known agents, above all on the severity of the working procedure of the articles being worked. In general the use concentrations of the new aids are in the range of about 0.1 to about 2% by weight. In special cases it is however also possible to exceed or fall below these values.

Aqueous liquids which contain the agents of the present invention may be applied as coolants, lubricants and rinsing liquids etc. in the usual metal working processes for iron or iron-containing alloys. The metal working processes may comprise cutting operations such as drilling, cutting, turning, milling, sawing, grinding, and non-cutting operations such as drawing, rolling, pressing, and also quenching during hardening. The application of aqueous metal working liquids according to the invention has proved particularly advantageous for example in grinding operations, because it prevented clogging and sticking of the grinding disks generally occurring when oily agents are used. At the same time, the new agents prevent corrosion of the ground work pieces which as such are particularly liable to corrosion.

The compounds of Formula I may with particular advantage also be used as highly effective corrosion inhibitors in aqueous liquids which are in contact with iron or with iron-containing alloys, outside metal-working, for example in aqueous cooling liquids. Here again they are already effective at the low use concentrations which have also been specified above for the use as metal-working agents.

It is essential for the sulphonamidocarboxylic acids of Formula I that the alkylene residue $R_4$ should have a chain length of at least 4 carbon atoms. In general one is dealing with compounds in which the chain length comprises up to about 15 carbon atoms. Compounds having 6 to 15 carbon atoms in the alkylene chain are preferably employed. Particularly suitable are compounds which contain, as the residue $R_3$ not hydrogen, but an alkyl group preferably the methyl or ethyl group.

The following may for example be mentioned as compounds of Formula I to be used in accordance with the invention:

benzenesulphonyl-N-methyl-δ-aminovaleric acid,
benzenesulphonyl-ε-aminocaproic acid,
benzenesulphonyl-N-methyl-ε-aminocaproic acid,
p-toluenesulphonyl-ε-aminocaproic acid,
p-toluenesulphonyl-N-methyl-ε-aminocaproic acid,
benzenesulphonyl-N-ethyl-ε-aminocaproic acid,
benzenesulphonyl-N-butyl-ε-aminocaproic acid,
xylenesulphonyl-N-methyl-ε-aminocaproic acid,
benzene-(1,3)-di-(N-methylsulphonamido-caproic acid),
naphthalene-(1,6-)-di-(N-methylsulphonamidocaproic acid),
anthracene-(2)-sulphonyl-N-methyl-ε-aminocaproic acid,
benzenesulphonyl-N-methyl-η-aminocaprylic acid,
p-toluenesulphonyl-N-methyl-ϑ-amino-octane-α-carboxylic acid,
benzenesulphonyl-τ-aminononane-α-carboxylic acid,
p-toluenesulphonyl-ω-aminoundecane-acid,
4-methoxybenzenesulphonyl-N-methyl-ε-aminocaproic acids,
4-chlorobenzenesulphonyl-N-methyl-ϑ-amino-valeric acid,
2,4-dichlorobenzenesulphonyl-N-methyl-ε-aminocaproic acid,
hexylbenzene- and isopropylbenzene-N-methyl-ε-aminocaproic acid,
diphenyl-sulphonamidovaleric acid,
diphenyl-N-methyl-sulphonamidovaleric acid,
diphenyl-sulphonamidocaproic acid,
diphenyl-N-methylsulphonamidocaproic acid,
2,2'-dimethyl-diphenylsulphonamidovaleric acid,
2,4'-dimethyl-diphenyl-N-methylsulphonamidocaproic acid,
2-bromodiphenylsulphonamidoundecane-acid,
3-bromodiphenyl-N-methylsulphonamidovaleric acid,
2-chlorodiphenyl-N-methyl-sulphonamidocaproic acid,
2-fluorodiphenylsulphonamidocaproic acid,
diphenylsulphonamidoundecane-acid,
diphenyloxide-sulphonamidovaleric acid,
diphenyloxide-N-butylsulphonamidovaleric acid,
diphenyloxide-sulphonamidocaproic acid,
diphenyloxide-N-methyl-sulphonamidocaproic acid,
4-chlorodiphenyloxide-sulphonamidovaleric acid,
diphenyloxide-sulphonamidoundecane-acid,
diphenyloxide-N-methylsulphonyl-η-aminocaprylic acid,
diphenylmethane-sulphonamidovaleric acid,
diphenylmethane-N-methylsulphonamidocaproic acid,
diphenylmethane-sulphonamidoundecane-acid,
diphenylsulphide-sulphonamidovaleric acid,
diphenylsulphide-sulphonamidocaproic acid,
diphenylsulphide-N-methylsulphonamidocaproic acid,
diphenylsulphon-sulphonamidovaleric acid,
diphenylsulphone-N-methylsulphonamidocaproic acid,
4-chlorodiphenyl-sulphonamidocaproic acid,
diphenylsulphone-sulphonamidoundecane-acid,
diphenylsulphoxide-sulphonamidovaleric acid,
diphenylsulphoxide-N-methylsulphonamidocaproic acid,
diphenylsulphoxide-sulphonamidoundecane-acid, and
2,2'-dichlorodiphenyl-sulphonamidovaleric acid.

The compounds according to the invention shown, when applied in aqueous liquids, very good corrosion protection behaviour towards iron and iron-containing alloys and a very good lubricating action and a low tendency to foaming. This is surprisingly the case even in the case of products based on long-chain aminocarboxylic acids, for example benzene-sulphonyl-ω-amino-undecane-acid.

The advantageous effect of the products according to the invention as regards corrosion protection, lubricating action and tendency to foam is for example shown in a comparison with a commercially available product based on a long-chain aliphatic sulphonamidocarboxylic acid. The superiority of the products according to the invention is also present compared to compounds of structure analogous to that corresponding to Formula I in which however the alkylene residue R, contains fewer than 4 carbon atoms in the chain.

The advantages of the products according to the invention compared to these compounds and compared to the known long-chain aliphatic sulphonamidocarboxylic acids can be seen from the investigation results summarised in the table which follows. In these investigations the corrosion protection effect of the various products was tested (I) by the so-called Herbert test using steel filings on a grey cast-iron plate (compare "IP-Standards for Petroleum and its Products," IP 125/63 (T)) and (II) according to the same test method but using grey cast-iron filings (GG 22) on steel plates. In order to investigate the lubricating effect the abrasion wear balance according to Reichert was employed, with the abrasion surface F being measured in mm.$^2$ and the specific surface pressure in kg./cm$^2$. The foaming action was determined according to DIN 53902 at 25° C.

The rating of the corrosion protection according to the two investigation methods (I) and (II) employed was carried out according to the following rating scale:

| Designation | Corrosion protection |
|---|---|
| +++ | Very good. |
| ++(+) | Good. |
| ++— | Adequate. |
| +—— | Present but not adequate. |
| ——(—) | Only slight. |
| ——— | Zero. |

In detail, the following products were employed for the investigations:

COMPOUND 1

Aliphatic sulphonamidocarboxylic acid-triethanolammonium salt having an average of 16 C atoms in the alkyl residues (comparison substance).

COMPOUND 2

Benzensulphonyl - N - methyl-α-aminoacetic acid-triethanolammonium salt (comparison substance).

COMPOUND 3

Benzenesulphonyl - N - methyl - γ - aminobutyric acid-triethanolammonium salt.

COMPOUND 4

Benzenesulphonyl - N - methyl - δ - aminovaleric acid-triethanolammonium salt.

COMPOUND 5

Benzenesulphonyl - N - methyl - ε - aminocaproic acid-triethanolammonium salt.

COMPOUND 6 p - Toluenesulphonyl - N - methyl - ε - aminocaproic acid-triethanolammonium salt.

COMPOUND 7

Naphthalene - (1,5) - di(N - methylsulphonamidocaproic acid)-triethanolammonium salt.

COMPOUND 8

Benzenesulphonyl - ω - aminoundecane - acid - triethanolammonium salt.

COMPOUND 9

4 - chlorobenzenesulphonyl - ε - aminocaproic acid-triethanolammonium salt.

COMPOUND 10

Alkylsulphonamidoacetic acid-triethanolammonium salt having an average of 16 C atoms in the alkyl residue (comparison substance).

COMPOUND 11

Diphenyloxide - N - methylsulphonamidocaproic acid-triethanolammonium salt.

COMPOUND 12

Diphenyloxide - sulphonamidocaproic acid-triethanolammonium salt.

COMPOUND 13

Diphenyl - N - methylsulphonamidocaproic acid-triethanolammonium salt.

COMPOUND 14

Diphenylsulphone - sulphonamidocaproic acid - triethanolammonium salt.

| Number of compound | Concentration of aqueous solution, percent by weight | Corrosion protection effect | | | | | | Lubricating effect load 1,500 g./100 running meters in spring water | | Foaming power |
|---|---|---|---|---|---|---|---|---|---|---|
| | | I steel filings/grey cast-iron plate | | | II grey cast-iron filings/steel plate | | | | | |
| | | Spring water 20° dH | Water 10° dH | E water [1] | Spring water 20° dH | Water 10° dH | E water [1] | Abrasion, mm.² | Specific surface pressure, kc./cm.² | |
| 1 | 5.0 | | | | − − (−) | − − − | − − − | 30 | 100 | Very strong. |
| | 3.0 | | | | − − − | − − − | − − − | | | |
| | 2.0 | ++(+) | ++ − | +− − | − − − | − − − | − − − | | | |
| | 1.0 | ++ − | ++ − | +− − | | | | | | |
| | 0.5 | − − − | − − − | − − − | | | | 32.2 | 93 | Do. |
| 2 | 5.0 | | | | − − − | − − − | − − − | 28.8 | 105 | Slight. |
| | 3.0 | | | | − − − | − − − | − − − | 33.0 | 90 | Do. |
| | 2.0 | | | | − − − | − − − | − − − | | | |
| | 1.0 | − − − | − − − | − − − | | | | 35.1 | 85 | Do. |
| | 0.5 | − − − | − − − | − − − | | | | | | |
| 3 | 5.0 | | | | +++ | | | 28.8 | 105 | Do. |
| | 3.0 | | | | | | | | | |
| | 2.0 | | | | − − − | | | 31.6 | 95 | Do. |
| | 1.0 | +− − | | | | | | 33.3 | 90 | Do. |
| | 0.5 | − − − | | | | | | | | |
| 4 | 5.0 | | | | +++ | | | 33.3 | 90 | Do. |
| | 3.0 | | | | | | | | 90 | Do. |
| | 2.0 | | | | ++ − | | | | | |
| | 1.0 | ++ − | | | | | | 31.6 | 95 | Do. |
| | 0.5 | +− − | | | | | | | | |
| 5 | 5.0 | | | | +++ | +++ | +++ | 23 | 131 | Do. |
| | 3.0 | | | | +++ | +++ | +++ | 32 | 94 | Do. |
| | 2.0 | | | | ++(+) | ++(+) | +++ | | | |
| | 1.0 | +++ | +++ | +++ | | | | 32 | 94 | Do. |
| | 0.5 | − − − | ++ − | +++ | | | | | | |
| 6 | 5.0 | | | | +++ | +++ | +++ | 22 | 137 | Do. |
| | 3.0 | | | | +++ | +++ | +++ | 27 | 110 | Do. |
| | 2.0 | | | | ++ − | ++(+) | +++ | | | |
| | 1.0 | +++ | +++ | +++ | | | | 33 | 91 | Do. |
| | 0.5 | ++(+) | ++(+) | ++ − | | | | | | Do. |
| 7 | 5.0 | | | | +++ | +++ | +++ | 19.8 | 151 | Do. |
| | 3.0 | | | | +++ | +++ | +++ | | | Do. |
| | 2.0 | | | | ++(+) | ++(+) | +++ | | | Do. |
| | 1.0 | +++ | +++ | +++ | | | | | | Do. |
| | 0.5 | ++ − | ++ − | +++ | | | | | | Do. |
| 8 | 5.0 | | | | ++ − | | | 11.5 | 260 | Do. |
| | 3.0 | | | | | | | 12.5 | 240 | |
| | 2.0 | | | | +− − | | | | | Do. |
| | 1.0 | ++ − | | | | | | 12.5 | 240 | Do. |
| | 0.5 | − − − | | | | | | | | Do. |
| 9 | 5.0 | | | | +++ | | | 20.9 | 145 | Do. |
| | 3.0 | | | | | | | | | |
| | 2.0 | | | | ++ − | | | | | |
| | 1.0 | ++ − | | | | | | 28.5 | 105 | Do. |
| | 0.5 | − − − | | | | | | | | |

[1] Softened water (2–3° dH).

| Number of compound: | Concentration of aqueous solution, percent by weight | Corrosion protection effect | | | | | | Foaming power 25° C. DIN 53902 |
|---|---|---|---|---|---|---|---|---|
| | | I steel filings/grey cast-iron plate | | | II grey cast-iron filings/steel plate | | | |
| | | Spring water 20° dH | Water 10° dH | E water | Spring water 20° dH | Water 10° dH | E water | |
| 10 | 5.0 | | | | --(-) | --- | --- | Very strong. |
| | 3.0 | | | | -- | --- | --- | Do. |
| | 2.0 | ++(+) | ++- | +-- | | | | Do. |
| | 1.0 | ++- | ++- | +-- | | | | |
| | 0.5 | --- | --- | | | | | |
| 11 | 5.0 | | | | +++ | +++ | +++ | Slight. |
| | 3.0 | | | | +++ | +++ | +++ | Do. |
| | 2.0 | | | | --+ | ++- | +++ | Do. |
| | 1.0 | +++ | +++ | +++ | | | | Do. |
| | 0.5 | --+ | ++(+) | ++(+) | | | | Do. |
| 12 | 5.0 | | | | ++(-) | ++(-) | +++ | Do. |
| | 3.0 | | | | | | | |
| | 2.0 | | | | | | | |
| | 1.0 | ++- | ++- | ++(+) | | | | |
| | 0.5 | | | | | | | |
| 13 | 5.0 | | | | +++ | +++ | +++ | Slight. |
| | 3.0 | | | | --- | +++ | +++ | Do. |
| | 2.0 | | | | --+ | --+ | +-- | |
| | 1.0 | | | | | | | |
| | 0.5 | --- | --+ | ++- | | | | |
| 14 | 5.0 | | | | +++ | +++ | +++ | Do. |
| | 3.0 | | | | ++(+) | ++(+) | +++ | Do. |
| | 2.0 | | | | --+ | ++- | +++ | |
| | 1.0 | ++(+) | ++(+) | +++ | | | | Do. |
| | 0.5 | --- | --+ | ++- | | | | Do. |

We claim:
1. In process for metal-working machining or non-cutting shaping of iron or iron-containing alloys which is carried out in the presence of an oil-free aqueous liquid containing 0.1 to 10% by weight a metal-working and corrosion inhibiting agent, the improvement consisting in applying as metal-working and corrosion inhibiting agent an aromatic sulfonamidocarboxylic acid of the formula

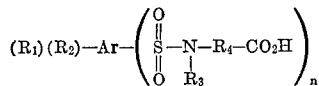

in the form of their water soluble or water dispersible salts of inorganic or organic bases, wherein $R_1$ and $R_2$ denote hydrogen, fluorine, chlorine, bromine, an alkyl residue or an alkoxy residue having 1 to 4 carbon atoms, with the sum of the carbon atoms of the residues $R_1$ and $R_2$ not exceeding the number 7, Ar denotes a benzene, naphthalene, anthracene, diphenyl, diphenylmethane, diphenyloxide, diphenylsulphide, diphenylsulphoxide or diphenylsulphone residue, $R_3$ denotes hydrogen, an alkyl residue having not more than 4 carbon atoms, the β-cyanoethyl residue or a hydroxyalkyl residue having 2 to 4 carbon atoms, $R_4$ denotes an alkylene residue with 4 to 15 carbon atoms in the chain which may furthermore optionally be substituted by methyl or ethyl groups, and $n$ denotes 1 and, if Ar is a benzene, naphthalene or anthracene residue, denotes 1 or 2.

2. The process as claimed in claim 1, wherein the aqueous liquid contains from 0.1 to 2% by weight of the sulfonamidocarboxylic acid salts.

3. Aqueous, oil-free metal-working liquids, characterized by 0.1 to 10% by weight content of aromatic sulfonamidocarboxylic acids of general formula

I

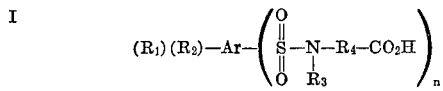

in the form of their water soluble or water dispersible salts of inorganic or organic bases as corrosion protection and metal-working agents, whereby $R_1$ and $R_2$ denote hydrogen, fluorine, chlorine, bromine, an alkyl residue or an alkoxy residue having 1 to 4 carbon atoms, with the sum of the carbon atoms of the residues $R_1$ and $R_2$ not exceeding the number 7, Ar denotes a benzene, naphthalene, anthracene, diphenyl, diphenylmethane, diphenyloxide, diphenylsulphide, diphenylsulphoxide or diphenylsulphone residue, $R_3$ denotes hydrogen, an alkyl residue having not more than 4 carbon atoms, the β-cyanoethyl residue or a hydroxyalkyl residue having 2 to 4 carbon atoms, $R_4$ denotes an alkylene residue with 4 to 15 carbon atoms in the chain which may furthermore optionally be substituted by one or more methyl or ethyl groups, and $n$ denotes 1 and, if Ar is a benzene, naphthalene or anthracene residue, denotes 1 to 2.

4. Metal-working liquids according to claim 3 containing the sulfonamidocarboxylic acid salts in a concentration of 0.1 to 2% by weight.

5. Aqueous, oil-free cooling liquids which are in contact with iron or iron-containing metal alloys and which contain 0.1 to 10% by weight as corrosion inhibiting agent an aromatic sulfonamidocarboxylic acid of the general formula

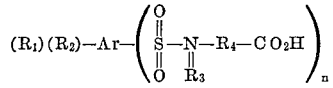

in the form of their water soluble or water dispersible salts of inorganic or organic bases, wherein $R_1$ and $R_2$ denote hydrogen, fluorine, chlorine, bromine, an alkyl residue or an alkoxy residue having 1 to 4 carbon atoms, with the sum of the carbon atoms of the residues $R_1$ and $R_2$ not exceeding the number 7, Ar denotes a benzene, naphthalene, anthracene, diphenyl, diphenylmethane, diphenyloxide, diphenylsulphide, diphenylsulphoxide or diphenylsulphone residue, $R_3$ denotes hydrogen, an alkyl residue having not more than 4 carbon atoms, the β-cyanoethyl residue or a hydroxyalkyl residue having 2 to 4 carbon atoms, $R_4$ denotes an alkylene residue with 4 to 15 carbon atoms in the chain which may furthermore optionally be substituted by methyl or ethyl groups, and $n$ denotes 1 and, if Ar is a benzene, naphthalene or anthracene residue, denotes 1 or 2.

References Cited

UNITED STATES PATENTS 2,236,168  3/1941  Dietrich _____ 252—47.5
3,027,405  3/1962  Spivack et al. _____ 252—47.5

DANIEL E. WYMAN, Primary Examiner

W. H. CANNON, Assistant Examiner

U.S. Cl. X.R.

252—389, 391